United States Patent [19]

Clark et al.

[11] 4,232,843
[45] Nov. 11, 1980

[54] MOLDED NOZZLE FOR ROCKET MOTOR

[75] Inventors: Michael N. Clark, Loretteville; Donald L. Smith, St. Foy, both of Canada

[73] Assignee: Her Majesty the Queen in right of Canada, as represented by the Minister of National Defence, Ontario, Canada

[21] Appl. No.: 891,924

[22] Filed: Mar. 30, 1978

[30] Foreign Application Priority Data

May 25, 1977 [CA] Canada .................................. 279107

[51] Int. Cl.² .............................................. F42B 13/32
[52] U.S. Cl. ................................ 244/3.29; 60/39.82 E; 60/256; 239/265.15; 239/265.19; 239/DIG. 19
[58] Field of Search ............................ 244/3.28, 3.29; 239/265.15, 265.11, 265.19, DIG. 19; 60/256, 39.82 E

[56] References Cited

U.S. PATENT DOCUMENTS

| | | | |
|---|---|---|---|
| 2,645,999 | 7/1953 | Bogard | 239/265.15 |
| 3,048,972 | 8/1962 | Barlow | 239/265.15 |
| 3,177,809 | 4/1965 | Russell-French | 244/3.29 |
| 3,635,404 | 1/1972 | Hopkins et al. | 239/265.15 |
| 3,695,556 | 10/1972 | Gauzza et al. | 244/3.28 |
| 3,952,970 | 4/1976 | Orzechowski et al. | 244/3.29 |

*Primary Examiner*—Robert B. Reeves
*Assistant Examiner*—Michael J. Forman
*Attorney, Agent, or Firm*—Cushman, Darby & Cushman

[57] ABSTRACT

A lightweight, relatively inexpensive rocket nozzle assembly which is heat resistant, ablative and electrically insulating. The body of the nozzle is molded in fibre reinforced thermosetting resin integrally with a forward metallic retaining ring, a rear metallic fin supporting ring and an electrical contact ring. A graphite throat insert is also provided and helical vanes are integrally molded into the rear portion of the nozzle to effect rotary motion of the exhaust gases. Wrap around fins are secured externally of the nozzle and provided with a retainer ring-shear pin assembly to hold the fins in the closed position for transport, and spring means to deploy the fins after firing and shearing of the shear pins.

10 Claims, 4 Drawing Figures

MOLDED NOZZLE FOR ROCKET MOTOR

This invention relates generally to rocket nozzle assemblies and more particularly to nozzle assemblies for a small diameter folding fin rocket.

A rocket nozzle assembly is required to fulfill a number of important functions which include (a) serving as a structural member for aerodynamic loads generated by the aerodynamic stabilizing fins, (b) serving as a structural member in the system which secures the rocket in the launcher prior to launch, (c) imparting a rolling torque to the rocket to thereby improve accuracy of the rocket and (d) carrying the contact devices which connect the rocket's ignition system to the launcher firing system. Heretofore, nozzle assemblies to fulfill the functions defined hereinabove have been fabricated as assemblies of machined and/or forged steel and aluminum components. Such assemblies require extensive machining operations carried out either at high piece part costs or high equipment investment costs and are therefore relatively costly. Further, because of the materials used, such prior art nozzles are unable to cope with the high temperatures of the combustion gases of modern, energetic composite propellants without recourse to secondary ablative or refractory liners. At least one side of the rocket ignitor circuit must be electrically insulated from the metal nozzle body which increases the complexity of the assembly. It will also be appreciated that any such nozzle assembly is relatively heavy which tends to diminish the performance of the rocket.

It is an object of the present invention to provide a relatively light and inexpensive fibre reinforced thermosetting plastic rocket nozzle assembly which will fulfill all of the functions of prior art assemblies and which will, in addition, be heat resistant, ablative and electrically insulating.

By one aspect of this invention there is provided a rocket nozzle assembly comprising:
  (a) a fibre-reinforced thermosetting plastic nozzle body having a throat and an exit;
  (b) a retaining ring circumscribing said body adjacent said throat;
  (c) a supporting ring circumscribing said body adjacent said exit; and
  (d) an electrical contact ring circumscribing said exit.

The invention will be described in more detail hereinafter with reference to the drawings in which.

Figure 1:
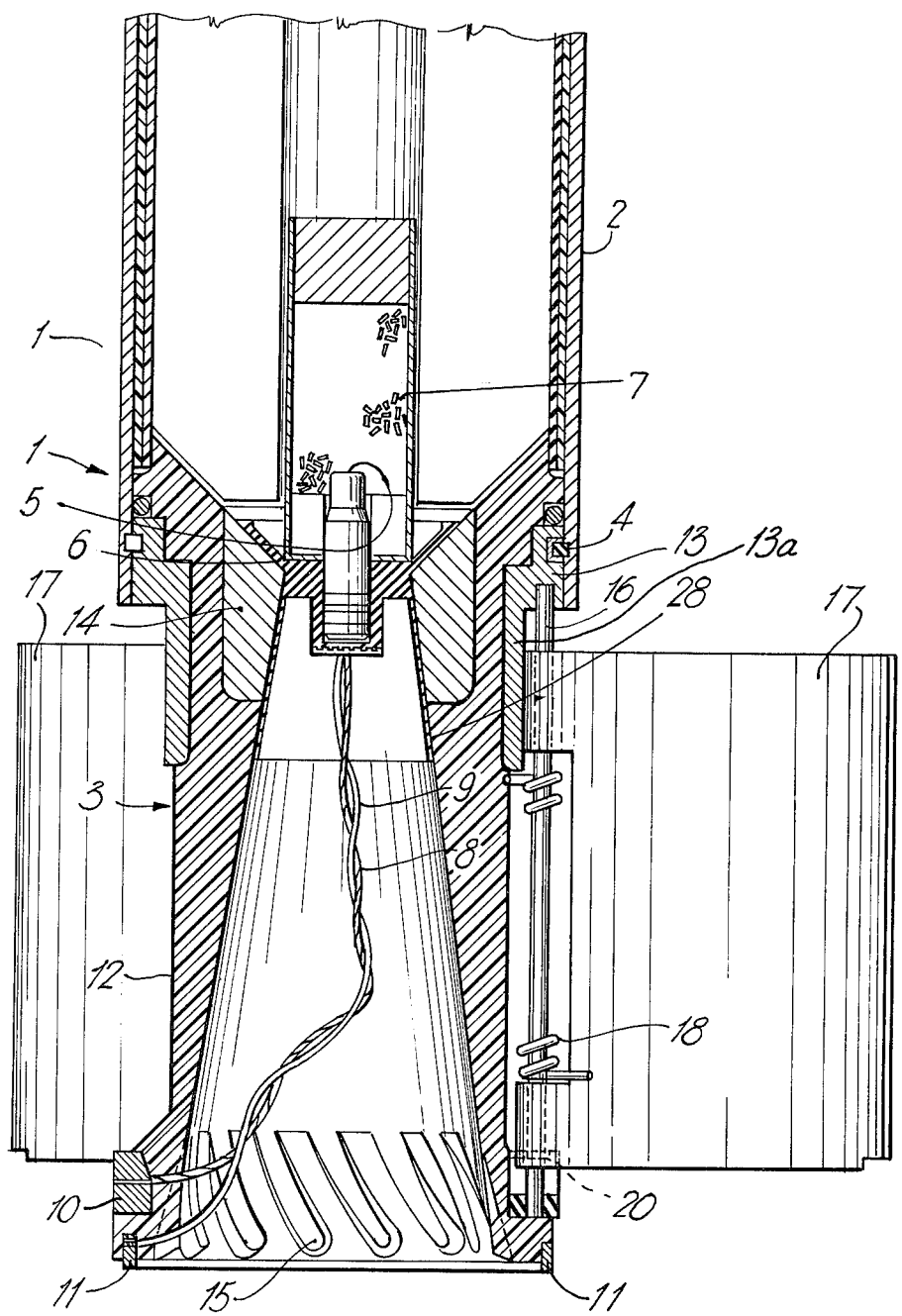
FIG. 1 is a cross-sectional view of the aft end of a rocket motor incorporating the nozzle assembly of the present invention.

A typical rocket motor 1, is shown in FIG. 1, and comprises a rocket motor chamber 2 having a nozzle 3 secured to the aft end thereof by any conventional means such as a lockwire 4. A rocket motor ignitor 5 is mounted in the motor chamber 2 adjacent the throat 6 of the nozzle. Propellant grain 7 is packed in the chamber 2 around the ignitor 5 in conventional manner. The ignitor 5 is provided with electrically insulated wires 8 and 9 connected respectively to a metallic fin support ring 10 and a metallic electrical contact ring 11 for ease of connection to the launcher firing circuit as described in more detail hereinafter. The nozzle 3 comprises an ablative thermosetting plastic nozzle body 12 integrally moulded with a metallic retaining ring 13, the metallic fin supporting ring 10 and the metallic electrical contact ring 11. The nozzle 3 is positioned in the aft end of said rocket motor chamber 2 such that the metallic retaining ring 13 is interposed between the rocket motor chamber 2 and the nozzle 3. Retention is provided by the lock wire 4. The retaining ring 13 includes an elongated flange portion 13a which extends longitudinally along a portion of the nozzle 3.

A graphite throat insert 14 is also provided. The plastic nozzle body 12 serves (a) to generate forward thrust on the rocket by accelerating the combustion gases in a rearward direction. In order to survive the intense heat flux from the exhaust gases, the inside surface of the nozzle ablates, leaving behind a tough carbonaceous residue; (b) to impart a rolling torque to the rocket immediately upon ignition, thus increasing the rocket's accuracy. The torque is produced by helical vanes 15 integrally moulded into the rear portion of the nozzle exit cone. These vanes cause a rotary motion of the exhaust gases which produces a resultant torque on the rocket. By making the vanes of ablative material, the vanes erode under the effect of the exhaust gases thus producing relatively less torque at the end of the firing than at the beginning; (c) to transmit loads generated by the fin support ring 10 forward to the retaining ring 13 and hence to the rocket vehicle; (d) to electrically insulate the electrical contact ring 11 from the rest of the rocket structure; (e) to transmit the hoop loads caused by the thermal expansion of the graphite insert 14 during firing to the retaining ring 13 and (f) to thermally insulate the metallic parts of the nozzle assembly from the extremely hot exhaust gas.

The key to the successful employment of the plastic nozzle body 12 as a load transmitting member lies in the material and moulding techniques used to produce the nozzle body.

The following properties are required of the moulded material:
  (i) good thermal insulating properties to protect the metallic parts;
  (ii) a low rate of ablation in the high temperature exhaust gas;
  (iii) a fibrous matrix to retain the charred surface layer thus reducing the rate of material erosion by the exhaust gas;
  (iv) a low amount of post moulding shrinkage with age to prevent separation between the retaining ring and plastic nozzle body; and
  (v) moderate tensile properties, in the order of 5,000 psi ultimate tensile strength.

These properties are readily available in a number of commercially available thermosetting phenolic moulding compounds reinforced with fibrous glass, asbestos, silica or graphite, such as Fiberite Corporation's FM 16771 (a phenolic-glass composition, Hooker Chemical Corporation's Durez ® 23639 (a phenolic-asbestos composition), Raybestos Manhattan Corp.'s 153-T RPD (a phenolic-asbestos composition) and Fiberite Corporation's MXC 313 P (a phenolic-graphite composition).

The metallic retaining ring 13 serves to transmit the net loads on the nozzle 3 to the motor casing 2 and the rocket structure, as well as supporting the front end of the fin pivot pins 16 (described in more detail hereinafter) thus taking out part of the aerodynamic loads, and reinforcing the plastic nozzle body 3 against the thermal expansion effects of graphite insert 14 upon firing.

The graphite throat insert 14 is preferably machined from a high grade of graphite such as Speer Graphite 890-S or 9RL, and serves to protect the plastic nozzle body 3 from the erosive effects of the combustion gases at the critical sonic throat area, and to support the ignitor.

Preferably, but not essentially, an elastomeric weather seal 28 is provided to cover the throat of the nozzle so as to prevent the entry of debris or moisture into the motor chamber and to retain the ignitor in the nozzle throat.

Figure 2:
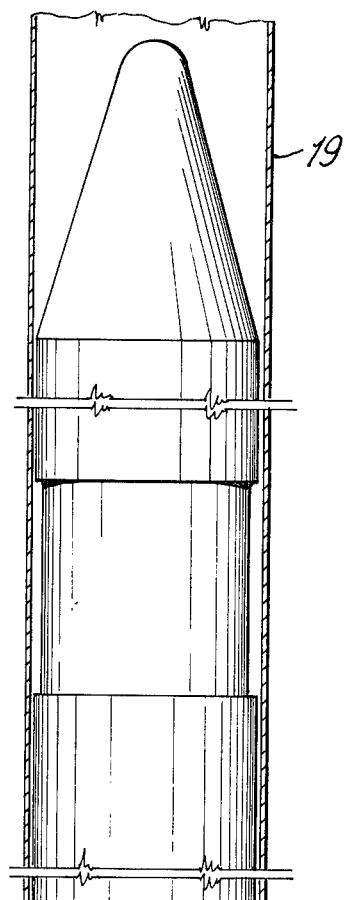
FIG. 2 is a side elevational view of the nozzle assembly of the present invention showing the wrap around fins in closed position.
Figure 2:
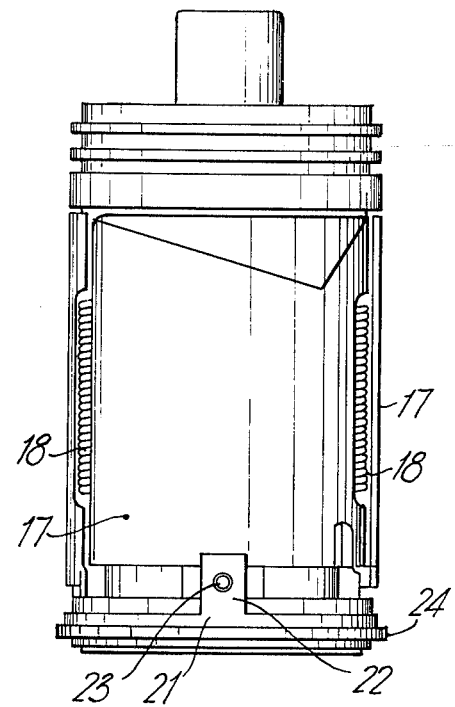

As shown most clearly in FIGS. 1 and 2 the nozzle assembly is provided with a plurality of wrap around fins 17 pivoted on fin pivot pins 16 and movable between a closed or wrap around position as shown in FIG. 2 and an open or deployed position as shown in FIG. 1, by means of torsion—compression springs 18. Generally the fins are fabricated in die cast aluminum, and three or more fins are employed.

As previously indicated the front end of pins 16 are supported by the metallic retaining ring 13 and the rear end of pins 16 are supported by fin support ring 10. The fin springs 18 deploy fins 17 as the rear end of the rocket clears the launch tube 19 (FIG. 3) and push the fins rearward into slots 20 in support ring 10 thus locking them in the deployed position.

Figure 3:
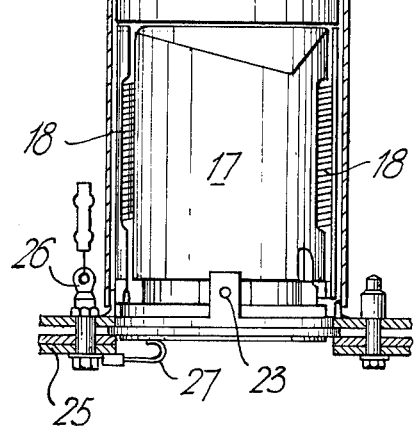
FIG. 3 is a cross-sectional view of a rocket incorporating the nozzle assembly of the present invention, in a rocket launcher.

As shown most clearly in FIGS. 2 and 3, the fins are prevented from opening during handling, storage and loading by means of a shear pin ring 21. This is accomplished by extending the tabs 22, through which the shear pins 23 pass, over a portion of the outer surface of each of the closed fins. As the shear pin ring remains behind in the launcher after firing, the fins are free to deploy upon exit from the launcher tube. The shear pin ring also serves to connect the rocket ignitor circuit to the ground (or common) side of the launcher firing circuit. The circuit passes from the ignitor lead, through the fin support ring, through the shear pin ring and hence to the launcher structure (i.e. ground).

For firing the rocket is breech loaded into the launcher in the manner of an artillery shell, the rocket being pushed forward until the lip 24 of the shear pin ring 21 abuts the aft face of the launcher, as shown in FIG. 3. A retaining plate 25 is then screwed onto the aft face of the launcher with screws 26, firmly clamping the lip 24 of the shear pin ring between the plate and the aft face of the launcher. Simultaneously, a spring contact 27 mounted on, and insulated from, the retaining plate and connected to the launcher firing circuit, is pressed against the contact ring 11 in the aft face of the nozzle. When the launcher circuit is energized, thus firing the ignitor 5 and in turn the main propellant charge, the shear pins 23 shear in the plane between the fin support ring and the shear pin ring when the rocket thrust develops to a specific level, thereby releasing the rocket and nozzle assembly from the shear pin ring for launch.

Figure 4:
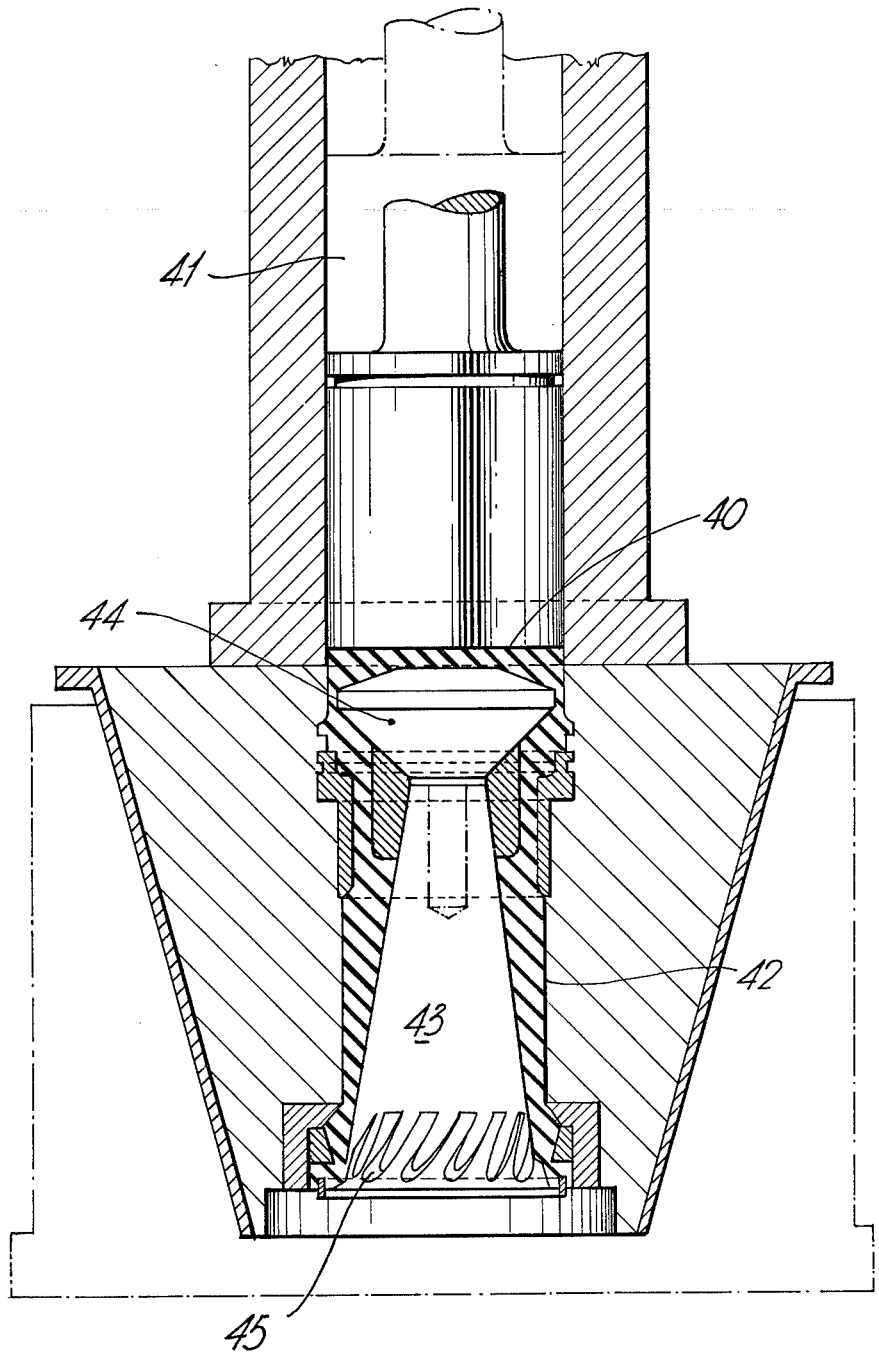
FIG. 4 is a cross-sectional view of a mould assembly for fabricating a nozzle assembly of the present invention.

In order to achieve the required properties at a low production cost, the nozzle should be moulded using the transfer technique, (FIG. 4), i.e. the moulding compound or plastic 40 is forced under pressure from an external chamber 41 or transfer pot through a sprue into a preheated split-mould cavity 42. The use of transfer moulding as opposed to simple compression moulding (i.e. where the moulding compound is placed directly into the open mould cavity and the mould is then closed), is necessary to minimize moulding time and hence cost.

The direction of material flow during transfer of the moulding compound from the transfer pot into the mould cavity should be in a direction parallel to the longitudinal axis of the nozzle. If the direction of material flow were perpendicular to the longitudinal axis (i.e. through the side of the nozzle), the flow would be split around the mould spigots 43, 44. When the two streams of moulding compound were to meet on the far side of the spigot, (i.e. the side of the nozzle opposite the sprue), the fibres would not blend, thus producing a longitudinal line of weakness in the hoop direction which would fail under the effects of the exhaust gas pressure.

The sprue through which the material is injected from the transfer pot into the mould should be a complete, unbroken annulas. Any discontinuities in the annulus, such as radial supports for the upper spigot 44, tend to cause separation of the fibres in the moulding compound downstream of the discontinuity with a resultant line of weakness.

The minimum dimension (width) of the annulus in the plane normal to the direction of material flow during injection should not be less than a specific fraction of the fibre length. This is desirable to prevent folding of the fibres with a concomitant weakening of the finished piece.

The recesses 45 cut into the lower spigot 43 to form the torque producing vanes in the nozzle exit cone must be helical in form about the longitudinal axis of the mould. This permits the lower spigot 43 to be extracted from the nozzle body with a simple rotational movement.

The spigot could not be removed from a nozzle with non-helical vanes unless it (the spigot) were built up from an assembly of pieces which could be disassembled or collapsed for removal from the nozzle body. Such a spigot would be more expensive to fabricate and manipulate than the one piece spigot for helical vanes.

The embodiments of the invention in which an exclusive property or privilege is claimed are defined as follows:

1. A rocket nozzle assembly comprising:
   (a) an ablative fibre-reinforced thermosetting plastic nozzle body having a throat and an exit for positioning in a rocket motor chamber;
   (b) an elongated metallic retaining ring integrally molded in an circumscribing said body adjacent said throat for positioning said nozzle body in said rocket motor chamber and to spread out aerodynamic and thermal expansion loads over the nozzle body and transmit these loads to the rocket motor chamber;
   (c) a metallic fin supporting ring integrally molded in and circumscribing said body adjacent said exit; and
   (d) a metallic electrical contact ring integrally molded in and circumscribing said exit electrically insulated from the rocket and adapted to be electrically connected to a firing circuit.

2. A rocket nozzle assembly as claimed in claim 1 including a graphite insert in said throat.

3. A rocket nozzle assembly as claimed in claim 1 including a plurality of fin means spaced around said nozzle body and pivotally supported between said retaining ring and said fin supporting ring, whereby said retaining ring and said fin supporting ring support the aerodynamic loads from said fin means.

4. A rocket nozzle assembly as claimed in claim 3 including spring means biasing said fin means from a closed position substantially around said nozzle body to a deployed position perpendicular thereto.

5. A rocket nozzle assembly as claimed in claim 4 including fin retaining ring means for retaining said fin means in said closed position.

6. A rocket nozzle assembly as claimed in claim 5 including shear pins in said fin-retaining ring means for securing said nozzle assembly to said retaining ring means.

7. A rocket nozzle assembly as claimed in claim 1, 2 or 3 including helical vane means integrally moulded in said nozzle body adjacent said exit.

8. A rocket nozzle assembly as claimed in claim 1, 2 or 3 wherein said thermmosetting plastic is reinforced with a fibrous material selected from the group consisting of glass, asbestos, silica and graphite.

9. A rocket nozzle assembly as claimed in claim 1, 2 or 3 including means to secure said retaining ring to a rocket casing.

10. A rocket nozzle assembly as claimed in claim 1, 2 or 3, wherein said thermosetting plastic is a phenolic moulding compound.

* * * * *